United States Patent Office 3,732,299
Patented May 8, 1973

3,732,299
ACENAPHTHENE CARBOXAMIDES
Seymour D. Levine, North Brunswick, and Ingeborg T. Harper, Kendall Park, N.J., assignors to E. R. Squibb & Sons, Inc., New York, N.Y.
No Drawing. Filed Nov. 3, 1969, Ser. No. 873,700
Int. Cl. C07c 103/76
U.S. Cl. 260—558 A 2 Claims

ABSTRACT OF THE DISCLOSURE

Acenaphthene derivatives are provided having the general structure

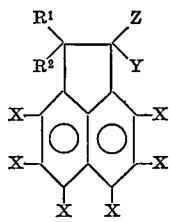

wherein at least one of $R^1$ and $R^2$ are alkyl and the other can be hydrogen; Z is —CN, —COOR$^3$ (wherein $R^3$ is hydrogen or a hydrocarbon radical or halophenyl), —CH$_2$OH,

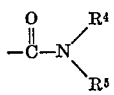

or

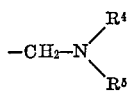

and Y is hydrogen or

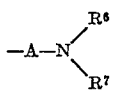

wherein $R^4$ to $R^7$ are hydrogen or a hydrocarbon radical, A is alkylene, and X is hydrogen, halogen, alkyl, alkoxy, haloalkyl or haloalkoxy. These compounds possess anti-inflammatory activity.

---

The present invention relates to acenaphthene derivatives and more particularly to acenaphthene carboxylic acids, nitriles and amides having anti-inflammatory activity and to intermediates for the preparation of these new compounds.

The compounds of this invention are useful as anti-inflammatory agents and are effective in the prevention and inhibition of granuloma tissue formation in warm blooded animals, for example, in a manner similar to indomethacin. They may be used to decrease joint swelling tenderness, pain and stiffness, in mammalian species, e.g., in conditions such as rheumatoid arthritis. A compound of Formula I or a physiologically acceptable salt (when applicable) of the character described hereinafter may be compounded according to accepted pharmaceutical practice in oral dosage forms such as tablets, capsules, elixirs or powders for administration of about 100 mg. to 2 gm. per day, preferably 100 mg. to 1 gm. per day in two to four divided doses. For example, about 150 mg./kg./day is effective in reducing paw swelling in rats.

The acenaphthene derivatives of the invention have the general formula

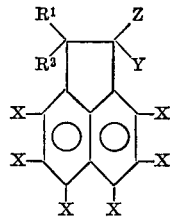

wherein $R^1$ and $R^2$ are the same or different and at least one must be alkyl having from one to about eight carbon atoms and preferably from about one to about three carbon atoms, and the other can be hydrogen. Z can be —CN, —COOR$^3$ (wherein $R^3$ is hydrogen or a hydrocarbon radical including alkyl having from one to about twelve and preferably from one to about six carbon atoms, phenyl, alkylphenyl or phenylalkyl having from seven to about fifteen and preferably from about seven to about ten carbon atoms or halophenyl), —CH$_2$OH,

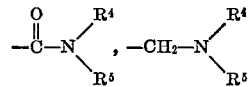

and Y can be hydrogen or

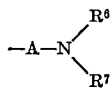

wherein $R^4$, $R^5$, $R^6$ and $R^7$ can be the same or different and can be hydrogen or a hydrocarbon radical including alkyl having from one to about eight and preferably from one to about six carbon atoms, alkenyl having from two to about eight and preferably from two to about five carbon atoms, phenyl and alkylphenyl or phenylalkyl having from seven to about fifteen and preferably from seven to about ten carbon atoms, and A is alkylene having from one to about six and preferably from one to about four carbon atoms. X can be hydrogen, halogen and alkyl, alkoxy, haloalkyl or haloalkoxy having from one to about ten and preferably from one to about six carbon atoms.

In Formula I, where Z is —CH$_2$OH, Y is

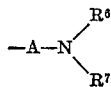

The alkyl radicals included in the compounds of the invention are straight or branched chain radicals and include, for example methyl, ethyl, propyl, isopropyl, n-butyl, s-butyl, t-butyl, n-pentyl, 2-methyl-n-butyl, neopentyl, n-hexyl, 2-methyl-n-pentyl, 3-methylpentyl, 2,2-dimethyl-2-butyl, 2,3-dimethyl-n-butyl-. The cycloalkyl groups included herein are cyclopropyl, cyclobutyl, cyclopentyl or cyclohexyl.

Examples of suitable alkenyl radicals include ethenyl, 1-butenyl, 2-propenyl and 3-pentenyl.

Examples of suitable alkylphenyl radicals include all isomers of tolyl, xylyl, mesityl, and butylphenyl.

The phenylalkyl radicals are preferred phenyl lower alkyl radicals, wherein the lower alkyl group contains up to about six carbon atoms, such as benzyl, phenethyl, and phenylbutyl.

Examples of suitable alkoxy radicals are those corresponding to the foregoing alkyl radicals.

The halogen may be F, Cl, Br or I.

Alkyl and alkoxy radicals substituted by fluorine, bromine, chlorine and iodine are encompassed by the terms haloalkyl and haloalkoxy. Trifluoromethyl and trifluoromethoxy are examples of preferred haloalkyl and haloalkoxy radicals.

Examples of suitable alkylene radicals (A) include methylene, ethylene, trimethylene, and tetramethylene.

As to the salts of the compounds of the invention, where applicable, those coming within the purview of this invention include the non-toxic physiologically acceptable acid-addition salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids, such as maleic, methane sulfonic, cyclohexane sulfamic, tartaric, citric, acetic and succinic acids.

The compounds of the invention can be prepared as follows.

The 1-acenaphthene carboxylic acids are prepared by reacting a 1-acenaphthenone

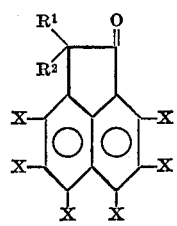

II with methylenetriphenylphosphorane in a Wittig reaction to form the corresponding 1-methylene acenaphthene.

The X-substituted acenaphthenones may be prepared, for example, by converting an X-substituted naphthalene carboxylic acid by known methods to the corresponding naphthalene acetic acid, and then converting the latter by known methods to the correspondingly substituted mono- or di-alkylated acenaphthenone.

The 1-methylene acenaphthene is converted to the 1-hydroxymethyl derivative by hydroboration, for example by treatment with sodium borohydride and boron trifluoride ethyletherate to form the organo-borane which is oxidized to the 1-hydroxymethyl derivative.

The 1-hydroxymethyl acenaphthene of the formula

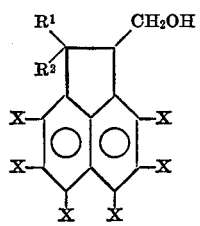

III for example, wherein $R^1$ and $R^2$ are methyl, X is hydrogen, is reacted with Jones Reagent to yield the corresponding 1-acenaphthene carboxylic acid.

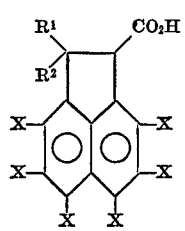

IV

The 1-acenaphthene carboxylic acids (Formula IV) can be reacted with thionyl chloride to form the acid chloride which is reacted with ammonia or a substituted amine to form the corresponding 1-acenaphthene amides

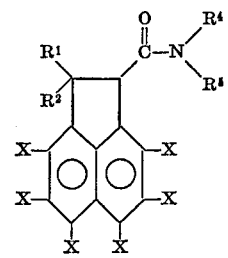

V where $R^4$ and $R^5$ are hydrogen.

The 1-acenaphthene amides are dehydrated with, for example, phosphorus pentoxide to form the 1-cyanoacenaphthene derivatives, of the structure

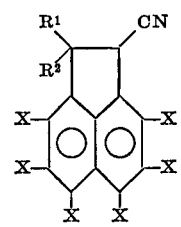

VI

The 1-cyanoacenaphthenes can then be treated with a basic reagent such as sodium hydride to form the anions, which are then treated with a substituted or unsubstituted aminoalkyl bromide or chloride, substituted by alkyl, phenylalkyl, alkylphenyl, or phenyl ($R^6$ and $R^7$) as defined hereinbefore such as, for example, dimethylaminoethyl bromide, to form the corresponding 1-cyano-1-aminoalkyl acenaphthenes of the formula

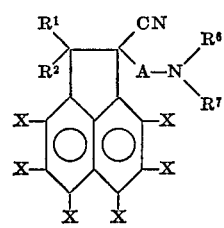

VII which can be hydrolyzed for example by treatment with polyphosphoric acid to the corresponding 1-aminoalkyl-1-acenaphthene carboxamides

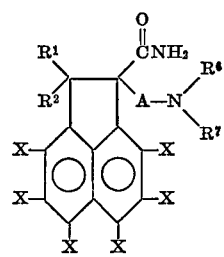

VIII

Other acenaphthene derivatives of the invention can be prepared as follows:

The 1-acenaphthene carboxylic acid esters of the formula

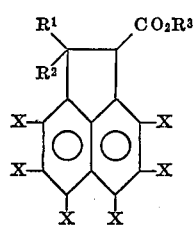

IX can be prepared from the corresponding acids employing conventional techniques.

The 1-aminoalkyl-1-acenaphthene carboxylic acids or esters of the structure

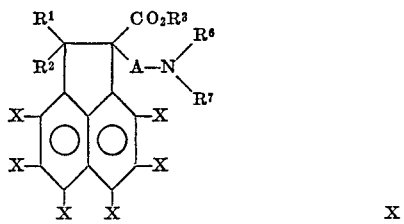

can be prepared by reaction of the 1-acenaphthene carboxylic ester (Formula IX) with a basic reagent such as sodium hydride, and an aminoalkyl halide. The corresponding acid can be formed by hydrolyzing the ester as would be apparent to one skilled in the art.

The 1-aminoalkyl - 1 - acenaphthene carboxylic acid or ester of Formula X can be reduced, for example, by treatment with lithium aluminum hydride, to the corresponding 1-hydroxymethyl-1-aminoalkyl-acenaphthene of the formula

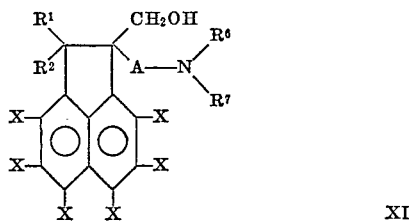

The 1-cyano-1-aminoalkyl-acenaphthene derivative of Formula VII can be reduced, for example, by reaction with lithium aluminum hydride, to the corresponding 1-aminoalkyl-1-aminomethyl-acenaphthene of the formula

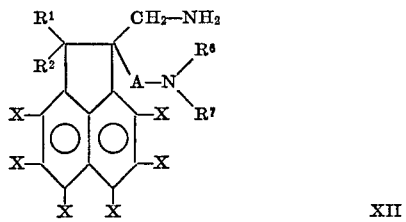

The 1-cyano-acenaphthene of Formula VI can be reduced by reaction with, e.g., lithium aluminum hydride, to form the corresponding 1-aminomethylacenaphthene of the formula

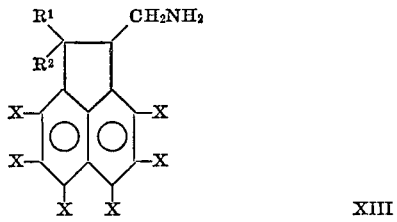

The following examples in the opinion of the inventors represent preferred embodiments of their invention.

EXAMPLE 1

(A) 2,2-dimethyl-1-acenaphthene carboxylic acid

A solution of methylenetriphenylphosphorane in ether is treated with 1.5 g. of 2,2-dimethyl-1-acenaphthenone in 35 ml. of ether and refluxed overnight. The reaction mixture is filtered and the filtrate washed with 8% salt solution, dried ($Na_2SO_4$) and evaporated to give 1-methylene-2,2-dimethyl acenaphthene.

A solution of 760 mg. of sodium borohydride in 20 ml. of diglyme is treated with 9 g. of the 1-methylene-2,2-dimethyl-acenaphthene in 10 ml. of diglyme and this solution is stirred under nitrogen at 20° C. while 3.2 ml. of boron trifluoride ethyletherate is added dropwise. The reaction mixture is stirred at room temperature and then treated with 5 ml. of water. The organoborane formed is then oxidized at 40–50° C. by the addition of 5 ml. of 3 N sodium hydroxide solution and 5 ml. of 30% hydrogen peroxide solution. The mixture is stirred at room temperature for 1 hour, extracted with ether and the ether extracts washed with water, 8% salt solution, dried ($Na_2SO_4$) and evaporated to give 1-hydroxymethyl-2,2-dimethyl-acenaphthene.

A solution of 13.6 g. of 2,2-dimethyl-1-hydroxymethyl acenaphthene in 700 ml. of acetone at 0° C. is stirred and treated with 65 ml. of Jones reagent (200 mg. $CrO_3$/ml.). The mixture is treated with methanol and filtered through diatomaceous earth (Hy-Flo). The filtrate is concentrated and the residue treated with chloroform and water. The chloroform layer is separated and the aqueous layer extracted with additional chloroform. The chloroform extracts are extracted with aqueous potassium hydroxide solution and the alkaline solution acidified and extracted with chloroform. The chloroform extracts are washed with 8% solution, dried ($Na_2SO_4$) and evaporated to give 5.8 g. of the title compound as an oil:

$\tau_{TMS}^{CDCl_3}$ 8.57, 8.35 (s., 2-$CH_3$), 5.68 (s., 1-H) and -0.2 (m., 1-$CO_2H$)

(B) 2,2-dimethyl-1-acenaphthene carboxamide

A solution of 0.68 g. of the 2,2-dimethyl-1-acenaphthene carboxylic acid in 5 ml. of thionyl chloride is refluxed for 1 hour. The excess thionyl chloride is removed by evaporation and the residue dissolved in 10 ml. of chloroform and treated with ammonia for 5 minutes. After standing overnight at room temperature, the chloroform suspension is washed with water, 8% salt solution, dried ($Na_2SO_4$) and evaporated. The residue is plate chromatographed on silica gel using ethyl acetate as the developing solvent. Elution of the major band with ethyl acetate, evaporation, and crystallization from ether-isopropyl ether gives the title compound in 2 polymorphic forms: 208 mg. (M.P. 108–110°) and 57 mg. (M.P. 122.5–124.5°). The analytical sample is prepared by recrystallization from acetone-isopropyl ether: M.P. 108–110°; λ KBr 6.04μ;

$\tau_{TMS}^{CDCl_3}$ 8.53, 8.39 (s., 2-$CH_3$) and 5.82 (s., 1-H)

Analysis.—Calcd. for $C_{15}H_{15}NO$ (percent): C, 79.97; H, 6.71; N, 6.22. Found (percent): C, 79.86; H, 6.77; N, 6.15.

(C) 2,2-dimethyl-1-cyanoacenaphthene

A solution of 4.56 g. of the 2,2-dimethyl-1-acenaphthene carboxamide in 270 ml. of toluene is stirred and treated with 9 g. of phosphorus pentoxide. This suspension is stirred and refluxed for 2 hours. The toluene is decanted and the residue treated with chloroform. The combined organic fractions are concentrated and then washed with saturated sodium bicarbonate solution, 8% salt solution, dried ($Na_2SO_4$) and evaporated to give 2.85 g. of the title compound as an oil. The analytical sample is prepared by vacuum distillation: λ neat 4.45μ;

$\tau_{TMS}^{CDCl_3}$ 8.41, 8.38 (s., 2-$CH_3$), and 5.63 (s., 1-H)

Analysis.—Calcd. for $C_{19}H_{22}N_2$ (percent): C, 81.97; 6.32; N, 6.76. Found (percent): C, 86.90; H, 6.42; N, 6.60.

(D) 1-cyano-1-[2-dimethylamino)ethyl]-2,2-dimethyl-acenaphthene

A solution of 2.85 g. of the 2,2-dimethyl-1-cyanoacenaphthene in 20 ml. of dimethylformamide is treated with 650 mg. of sodium hydride and stirred under nitrogen for 1 hour. This solution is treated with 2.6 g. of dimethylaminoethyl bromide in 75 ml. of toluene and stirred under nitrogen overnight. The reaction mixture is poured into water, the toluene layer separated, and the aqueous extracted with ether. The combined organic fractions are extracted with 2 N hydrochloric acid. The acid extract is made alkaline and extracted with ether. The ether extracts are washed with 8% salt solution, dried ($Na_2SO_4$) and evaporated to give 2.89 g. of the title compound as an oil. The analytical sample is prepared by vacuum distillation and then crystallization from petroleum ether: M.P. 69–70°; $\lambda KBr$ 4.46μ;

$\tau_{TMS}^{CDCl_3}$ 8.49, 8.42 (s., 2–$CH_3$), and 7.91 (s., 1–$N(CH_3)_2$)

*Analysis.*—Calcd. for $C_{19}H_{22}N_2$ (percent): C, 81.98; H, 7.97; N, 10.06. Found (percent): C, 82.05; H, 8.15; N, 10.17.

EXAMPLE 2

1-[2-(dimethylamino)ethyl]-2,2-dimethyl-1-acenaphthene carboxamide

A mixture of 2.89 g. of 1-cyano-1-[2-(dimethylamin)ethyl] - 2,2 - dimethylacenaphthene (as prepared in Example 1D) in 75 ml. of polyphosphoric acid is stirred for 1.5 hours in a 120° oil bath. The mixture is then poured into ice-water and extracted with ether. The aqueous solution is made alkaline and then extracted with ether. The ether extracts are washed with 8% salt solution, dried ($Na_2SO_4$) and evaporated. The residue is plate chromatographed on silica gel using ethyl acetate-methanol (3:1) as the developing solvent. The major band is eluted with ethyl acetate-methanol (7:3), and evaporated to give an oil. The oil is vacuum distilled to give 1.14 g. of the title compound, M.P. 49–51°. The analytical sample is prepared by vacuum distillation: M.P. 49–51°; $\lambda KBr$ 5.99μ;

$\tau_{TMS}^{CDCl_3}$ 8.74, 8.37 (s., 2–$CH_3$) and 7.87 (s., 1–$N(CH_3)_2$)

*Analysis.*—Calcd. for $C_{19}H_{24}N_2O$ (percent): C, 76.99; H, 8.16; N, 9.45. Found (percent): C, 77.24; H, 8.70; N, 9.17.

EXAMPLE 3

(A) 2-ethyl-1-acenaphthene carboxylic acid

Following the procedure of Example 1A, but substituting 2-ethyl-1-acenaphthenone for 2,2-dimethyl-1-acenaphthenone a mixture of isomers of the title compound is obtained.

(B) 2-ethyl-1-acenaphthene carboxamide

Following the procedure of Example 1B, but substituting a mixture of isomers of 2-ethyl-1-acenaphthene carboxylic acid for 2,2-dimethyl-1-acenaphthene carboxylic acid, a mixture of isomers of the title compound is obtained.

(C) 2-ethyl-1-cyanoacenaphthene

Following the procedure of Example 1C, but substituting a mixture of isomers of 2-ethyl-1-acenaphthene carboxamide for 2,2-dimethyl-1-acenaphthene carboxamide, a mixture of isomers of the title compound is obtained.

(D) 1-cyano-1-[3-(methylethylamino)propyl]-2-ethyl-1-acenaphthene

Following the procedure of Example 1D, but substituting a mixture of isomers of 2-ethyl-1-cyanoacenaphthene for 2,2 - dimethyl - 1 - cyanoacenaphthene, and methylethylamino propyl bromide for dimethylaminoethyl bromide, a mixture of isomers of the title compound is obtained.

EXAMPLE 4

1-[3-(methylethylamino)propyl]-2-ethyl-1-acenaphthene carboxamide

Following the procedure of Example 2, but substituting a mixture of isomers of 1-cyano-1-[3-(methylethylamino)propyl]-2-ethyl-1-acenaphthene for 1-cyano-1 - [2 - (dimethylamino)ethyl]-2,2-dimethylacenaphthene a mixture of isomers of the title compound is obtained.

EXAMPLE 5

Methyl 2,2-dimethyl-1-acenaphthene carboxylic acid

A solution of 1.0 g. of 2,2-dimethyl-1-acenaphthene carboxylic acid as prepared in Example 1A in 20 ml. of ether is treated with an excess of diazomethane in ether for 30 minutes. The mixture is treated with acetic acid, filtered and the filtrate washed with 8% salt solution, dried ($Na_2SO_4$) and evaporated to give a 0.99 g. residue. The residue is chromatographed on a column of 30 g. of neutral alumina (Act. I) and eluted with benzene, benzene-chloroform 9:1, and benzene-chloroform 2:1 to yield 0.43 g. of the title compound as an oil: $\lambda Chf$ 5.85μ.

EXAMPLE 6

2,2-dimethyl-1-acenaphthene carboxylic acid diethylamide

Following the procedure of Example 1B, but substituting diethylamine for ammonia, the title compound is obtained.

EXAMPLE 7

Methyl 1-[2-(dimethylamino)ethyl]-2,2-dimethyl-1-acenaphthene carboxylic acid

Following the procedure of Example 1D, but substituting methyl 2,2-dimethyl-1-acenaphthene carboxylic acid as prepared in Example 5 for 2,2-dimethyl-1-cyanoacenaphthene, the title compound is obtained.

EXAMPLE 8

1-hydroxymethyl-1-dimethylaminoethyl-2,2-dimethyl-acenaphthene

A solution of 1.3 g. of methyl 1-[2-(dimethylamino)ethyl]-2,2-dimethyl-1-acenaphthene carboxylic acid, as prepared in Example 7, in 50 ml. of tetrahydrofuran is treated with 0.5 g. of lithium aluminum hydride and refluxed overnight. The excess hydride is decomposed with ethyl acetate and water and then the mixture is extracted with ethyl acetate. The ethyl acetate extract is washed with water, 8% salt solution, dried ($Na_2SO_4$) and evaporated to give the title compound.

EXAMPLE 9

1-[2-(dimethylamino)ethyl]-2,2-dimethyl-1-acenaphthene carboxylic acid

A solution of 1.4 g. of methyl 1-[2-(dimethylamino)ethyl]-2,2-dimethyl-1-acenaphthene carboxylic acid and 1.0 g. of sodium hydroxide in 1 ml. of water and 16 ml. of ethylene glycol is refluxed for 24 hours. The reaction mixture is poured into water and extracted with ether. The aqueous phase is acidified with 2 N CHl and extracted with chloroform. The chloroform extracts are washed with 8% salt solution, dried ($Na_2SO_4$) and evaporated to give the title compound.

EXAMPLE 10

1-[2-(dimethylamino)ethyl]-2,2-dimethyl-1-acenaphthene carboxylic acid diethyl amide Following the procedure of Example 1B, but substituting 1 - [2 - (dimethylamino)ethyl]-2,2-dimethyl-1-acenaphthene carboxylic acid for 2,2-dimethyl--acenaphthene carboxylic acid and diethyl amine for ammonia, the title compound is obtained.

EXAMPLE 11

1-diethylaminomethyl-1-[2-(dimethylamino)ethyl]-2,2-dimethyl acenaphthene

A solution of 4.5 g. of 1-[2-(dimethylamino)ethyl]2,2-dimethyl-1-acenaphthene carboxylic acid diethylamide in 50 ml. of tetrahydrofuran is treated with 1.5 g. of lithium aluminum hydride and refluxed overnight. The excess hydride is decomposed with ethyl acetate and water and then the mixture is extracted with ethyl acetate. The ethyl acetate extract is washed with water, 8% salt solution, dried (Na$_2$SO$_4$) and evaporated to give the title compound.

EXAMPLE 12

2,2-dimethyl-1-aminomethyl-acenaphthene

A solution of 2.0 g. of 2,2-dimethyl-1-cyanoacenaphthene, as prepared in Example 1C, in 25 ml. of tetrahydrofuran is treated with 0.75 g. of lithium aluminum hydride and refluxed overnight. The excess hydride is decomposed with ethyl acetate and water and the mixture is extracted with ethyl acetate. The ethyl acetate extract is washed with water, 8% salt solution, dried (Na$_2$SO$_4$) and evaporated to give the title compound.

EXAMPLE 13

1-cyano-1-[2-(methylbenzylamino)ethyl]-2,2-dimethyl acenaphthene

Following the procedure of Example 1D, but substituting methylbenzylaminoethyl bromide for dimethylaminoethyl bromide, the title compound is obtained.

EXAMPLE 14

1-[2-(methylbenzylamino)ethyl]-2,2-dimethyl-1-acenaphthene carboxamide

Following the procedure of Example 2, but substituting 1-cyano-1-[2-(methylbenzylamino)ethyl]-2,2-dimethyl-acenaphthene for 1-cyano-1-[2-(dimethylamino)ethyl]-2,2-dimethyl-acenaphthene, the title compound is obtained.

What is claimed is:
1. A compound having the structural formula

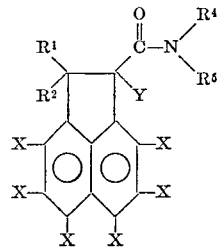

wherein Y is

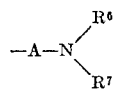

R$^1$ and R$^2$ are selected from the group consisting of hydrogen and alkyl of one to eight carbons, at least one of R$^1$ and R$^2$ being alkyl; R$^4$, R$^5$, R$^6$ and R$^7$ can be the same or different and are selected from the group consisting of hydrogen, alkyl having from one to about eight carbon atoms, cycloalkyl having from three to six carbons, alkenyl having from two to about eight carbon atoms, phenyl and mono-, di- or trialkylphenyl and phenylalkyl having from seven to about fifteen carbon atoms, A is alkylene having from one to about six carbons and X is selected from the group consisting of hydrogen, halogen, alkyl having from one to about ten carbon atoms, and alkoxy having from one to about ten carbon atoms and which contains 1 or 2 X-substituents other than hydrogen and where X is halogen, from 1 to 3 halogen atoms are present.

2. A compound according to claim 1 having the name 1-[2-(dimethylamino)ethyl]-2,2-dimethyl - 1 - acenaphthene carboxamide.

References Cited

UNITED STATES PATENTS 3,565,944  2/1971  Lee et al. _____ 260—558 R

OTHER REFERENCES

Bosch et al., Canadian J. Chem., vol. 46, p. 715–28 (1968).

HARRY I. MOATZ, Primary Examiner

U.S. Cl. X.R.

260—465 R, 465 E, 465 F, 465 G, 469, 471 A, 473 F, 515 R, 515 A, 518 R, 518 A, 519, 520, 558R, 570.8, 570.9, 618 F, 590; 424—304, 309, 317, 324, 330, 343